(12) United States Patent
Collins, Jr. et al.

(10) Patent No.: US 7,214,913 B2
(45) Date of Patent: May 8, 2007

(54) CONTROLLED FLOW INSTRUMENT FOR MICROWAVE ASSISTED CHEMISTRY WITH HIGH VISCOSITY LIQUIDS AND HETEROGENEOUS MIXTURES

(75) Inventors: Michael John Collins, Jr., Charlotte, NC (US); Wyatt Price Hargett, Jr., Matthews, NC (US); Edward Earl King, Charlotte, NC (US); Joseph Joshua Lambert, Charlotte, NC (US); James Edward Thomas, Harrisburg, NC (US)

(73) Assignee: CEM, Corporation, Matthews, NC (US)

(*) Notice: Subject to any disclaimer, the term of this patent is extended or adjusted under 35 U.S.C. 154(b) by 0 days.

(21) Appl. No.: 11/151,500

(22) Filed: Jun. 13, 2005

(65) Prior Publication Data

US 2005/0230381 A1   Oct. 20, 2005

Related U.S. Application Data

(63) Continuation of application No. 10/605,021, filed on Sep. 2, 2003.

(51) Int. Cl.
*H05B 6/74* (2006.01)

(52) U.S. Cl. .................. 219/686; 219/687; 219/679

(58) Field of Classification Search ............ 219/686, 219/687, 679, 704, 711, 696, 726, 745, 746, 219/640, 750, 751, 748, 749; 422/21, 129, 422/186, 187, 186.29, 199; 34/393; 204/164

See application file for complete search history.

(56) References Cited

U.S. PATENT DOCUMENTS 3,917,699 A   11/1975   Fuhrmann et al.
3,926,556 A   12/1975   Boucher
4,613,738 A    9/1986   Saville (Continued)

FOREIGN PATENT DOCUMENTS

| DE | 195 18 540 A1 | 11/1996 |
|----|---------------|---------|
| DE | 197 00 499 A1 | 6/1998 |
| EP | 0335020 | 4/1989 |
| EP | 0455513 | 6/1991 |
| EP | 1547681 A3 | 9/2005 |
| WO | WO 93/05345 A | 3/1993 |

OTHER PUBLICATIONS

Stephen J. Haswell et al.; On-line Microwave Digestion of Slurry Samples With Direct Flame Atomic Absorption Spectrometric Elemental Detection; Analyst, Feb. 1992; vol. 117; pp. 117-120.

(Continued)

*Primary Examiner*—Quang Van
(74) *Attorney, Agent, or Firm*—Summa, Allan & Additon, P.A.

(57) ABSTRACT

A controlled-flow microwave instrument for chemical synthesis using heterogeneous or highly viscous starting materials includes a microwave source for generating electromagnetic radiation in the microwave frequencies, a microwave cavity in wave communication with the source for exposing compositions placed therein to microwave radiation, a microwave-transparent pressure resistant reaction vessel in the cavity, a source reservoir for starting materials and related compositions, a pump in communication with the source reservoir for pumping heterogeneous or highly viscous materials from the source reservoir to the reaction vessel, and a pressure-resistant valve between the pump and the reaction vessel for isolating the reaction vessel from the pump and the source reservoir during application of microwave energy to compositions in the vessel and from any resulting high pressures generated therein.

12 Claims, 3 Drawing Sheets

U.S. PATENT DOCUMENTS

| | | | |
|---|---|---|---|
| 4,736,083 | A | 4/1988 | Saville |
| 5,215,715 | A | 6/1993 | Haswell et al. |
| 5,319,172 | A | 6/1994 | Komatsu |
| 5,387,397 | A | 2/1995 | Strauss et al. |
| 5,403,564 | A | 4/1995 | Katschnig et al. |
| 5,420,039 | A | 5/1995 | Renoe et al. |
| 5,672,316 | A | 9/1997 | Knapp |
| 5,796,080 | A | 8/1998 | Jennings et al. |
| 5,932,075 | A | 8/1999 | Strauss et al. |
| 5,972,711 | A | 10/1999 | Barclay et al. |
| 6,086,830 | A | 7/2000 | Kartchner |
| 6,120,741 | A * | 9/2000 | Jacquault et al. ............ 422/199 |
| 6,273,886 | B1 | 8/2001 | Edwards et al. |
| 6,288,379 | B1 | 9/2001 | Greene et al. |
| 6,455,317 | B1 | 9/2002 | Lautenschlager |
| 6,508,918 | B2 * | 1/2003 | Campagna et al. ......... 204/164 |
| 6,521,876 | B2 | 2/2003 | Jennings et al. |
| 6,607,920 | B2 | 8/2003 | Jennings et al. |
| 6,614,010 | B2 | 9/2003 | Fagrell et al. |
| 6,744,024 | B1 | 6/2004 | Hayes et al. |
| 6,867,400 | B2 | 3/2005 | Collins et al. |
| 2001/0006146 | A1 | 7/2001 | Campagna |
| 2002/0117498 | A1 | 8/2002 | Jennings |
| 2002/0198230 | A1 * | 12/2002 | Kingston .................... 514/310 |
| 2003/0089706 | A1 | 5/2003 | Jennings |
| 2003/0170149 | A1 | 9/2003 | Jennings |
| 2003/0199099 | A1 | 10/2003 | King et al. |
| 2004/0179977 | A1 | 9/2004 | Hargett, Jr. |
| 2005/0045625 | A1 | 3/2005 | Collins, Jr. et al. |
| 2005/0045626 | A1 | 3/2005 | Collins, Jr. et al. |

OTHER PUBLICATIONS

Vassili Karanassios et al.; Rapid Stopped-flow Microwave Digestion System; Journal of Analytical Atomic Spectrometry, Sep. 1991; vol. 6; pp. 457-463.

Overview of Peptide Synethsis. Anaspec. Accessed online Feb. 15, 2006 at http://www.anaspec.com/html/peptide_notes.html, pp. 1-11.

Kappe, Speeeding Up Solid-Phase Chemistry by Microwave Irradiation. A Tool for High-Throughput Synthesis. American Laboratory, 2001, vol. 33, No. 10, pp. 13-16, 18-19.

Murray et al., Efficient Synthesis of a B-Peptide Combinatorial Library with Microwave-Irradiation. JACS. 2005, vol. 127, pp. 13217-13280.

Al-Obeidi, et al., apid Microwave-Assisted Solid-phase Synthesis (MASS): Parallel and Combinatorial Chemical Library Synthesis. Mini Reviews in Medicinal Chemistry. 2003, vol. 3, pp. 449-460.

Lew et al., Increasing Rates of Reaction: Microwave-Assisted Organic Synthesis for Combinatorial Chemistry. J. Comb Chem. Mar./Apr. 2002, vol. 4, No. 2, pp. 95-105.

Lange et al., Recent Advances in Microwave-Assisted Combinatorial Synthesis and Lilbrary Generation. Combinatorial Chemistry and High Throughput Screening. 2005, vol. 8, pp. 595-606.

Scharn et al., Spatially Addressed Synthesis of Amino- and Amino-Oxy-Substituted 1,3,5-Triazine Arrays on Polymeric Membranes. J. Comb Chem. 2000., vol. 2, pp. 361-369.

Scharn et al., Sequential Nucleophilic Substitution on Halogenated Triazines, Pyrimidines, and Purines: A Novel Approach to Cyclic Peptidomimetics. J. Org Chem. 2001, vol. 66, pp. 507-513.

* cited by examiner

CONTROLLED FLOW INSTRUMENT FOR MICROWAVE ASSISTED CHEMISTRY WITH HIGH VISCOSITY LIQUIDS AND HETEROGENEOUS MIXTURES

This is a continuation of copending application Ser. No. 10/605,021 filed Sep. 2, 2003.

BACKGROUND

The present invention relates to microwave-assisted chemical processes and in particular relates to microwave-assisted chemical synthesis, carried out in automated, controlled-flow fashion, using heterogeneous and high-viscosity compositions and while providing for high pressure reactions.

The use of microwaves to provide energy to initiate, drive or control chemical reactions is well-established. Although conceptually, microwaves can be used to affect a wide variety of chemical reactions, the commercial use of microwave assisted chemistry initially grew most rapidly in techniques such as loss-on-drying (gravimetric) moisture analysis and digestion reactions that provided the foundation for content analysis. Indeed, such reactions still represent a major part of the instrument market for microwave assisted chemistry. In particular, gravimetric analysis and digestion can often be carried out in rather robust fashion, for which the longer wavelengths and broad control parameters of microwaves are well-suited.

More recently, interest has greatly increased in using microwaves to drive more sensitive reactions, particularly organic synthesis, and to do so on the smaller scale—and thus more highly controlled basis—that is preferred (or necessary) in many research oriented applications. Both the speed and nature of microwaves offer certain advantages. Because microwaves react immediately with polar and semipolar materials, they help avoid the lag time inherent in other forms of energy transfer such as conduction or convection heating. Thus, they offer a time advantage for many research schemes including those broadly referred to as "combinatorial chemistry." Just as importantly, however, electromagnetic radiation in the microwave frequencies can affect individual molecules (and thus compositions) somewhat differently—and thus potentially more favorably—than convention or conduction heating. Some of these advantages are explained in more detail in Hayes, Microwave Synthesis-Chemistry at the Speed of Light, 2002 CEM Publishing (ISBN 0-9722229-0-1).

As an additional factor, single mode cavity microwave instruments have become commercially available that are well-suited for controlled application of microwave radiation to small samples. These include the VOYAGER®, DISCOVER® and EXPLORER® instruments available from CEM Corporation, Matthews, N.C., for which more formal descriptions are set forth (but not limited to) U.S. Published Patent Applications Nos. 20030089706 and 20020117498, U.S. Pat. Nos. 6,867,400; 6,744,024; 6,607,920; and 6,521,876, and pending unpublished application Ser. No. 10/249,011 filed Mar. 10, 2003 and Ser. No. 10/126,838 filed Apr. 19, 2002. The contents of all of these are incorporated entirely herein by reference.

Several of these devices are batch-type devices; i.e. microwaves are applied to a fixed sample in a closed reaction vessel (or a set of fixed samples in several respective separate vessels. When an additional reaction is to be carried out, a new set of starting materials are placed in a new reaction cell which is placed in turn in the microwave cavity. Although the use of individual vessels can be automated, for the most part the reactions must be carried out in batch fashion.

For some commercial applications, however, a constant or continuous reaction scheme—i.e. exposing a continuous stream of reactants to the microwaves and producing a continuous stream of product, without intermittent manipulation of a series of vessels—is attractive or necessary option. The present generation of instrument suitable for this type of reaction is exemplified by CEM's VOYAGER® instrument (e.g. U.S. Pat. No. 6,867,400). This type of instrument is broadly exemplified by an appropriate source of liquid starting materials, suitable fluid pumps (with those for high pressure liquid chromatography, "HPLC" being exemplary), and a flow path that carries the reactants through a microwave field for a time sufficient for a desired reaction to take place. The time spent in the microwave field is, however, dictated by the diameter and length of the flow path taken together with the flow rate of the reactants. Because practical considerations tend to limit the length of the flow path that can be conveniently placed in a commercial instrument, the time spent in the microwave field is also limited.

Although the latest generation of both the batch and continuous systems offer significant advantages for chemical synthesis, each includes characteristics that preclude it from handling certain types of reactions. The batch systems can handle high pressure and heterogeneous starting materials, but cannot offer continuous operation from a reactant source. The flow-through systems can use reactants and generate products on a continuous basis, but generally cannot handle (because of pumping or flow considerations) heterogeneous starting materials or high viscosity fluids, or do so at high pressures. For example, conventional HPLC pumps cannot handle higher viscosity liquids or any solids whatsoever. Even if pumps that can handle solids are incorporated, however, the available flow rates raise specific problems in microwave assisted chemistry. Higher flow rates help move solids through the instrument but reduce the available time spent in the microwave field. Lower flow rates will (mathematically at least) increase residence time in the microwave field, but tend to encourage heterogeneous mixtures (typically liquid reactants and solvents in combination with solid-phase catalysts or solid-supported reagents) to separate into their respective phases before reacting properly or, in severe cases, blocking the flow path and rendering the instrument temporarily or permanently unusable.

Flow-through devices also lack a stirring capability, which can be particularly important for heterogeneous mixtures. Furthermore, precise temperature control (as opposed to consistent application of microwave radiation) is different or impossible in flow-through systems. Additionally, many prior flow-through systems require multimode cavities or otherwise operate in multimode fashion. Finally, conventional flow-through systems can often handle homogeneous liquids at high pressure or heterogeneous mixtures at low pressures, but cannot provide a continuous flow reaction system for carrying out high pressure reactions on heterogeneous materials. Because higher pressures (e.g. up to 250 psi or more) are advantageous to or necessary for certain reaction schemes, the ability to carry them out on an automated or flow through basis presents a function disadvantage.

Prior descriptions of proposed (or actual) flow-though or continuous devices tend to reflect—even if by silence—these limitations.

For example, U.S. Pat. No. 5,387,397 to Strauss discloses a flow-through microwave instrument that can nominally provide "a continuous and pressurized feed of liquid or slurry to and through a microwave heating zone" (column 2, lines 46–47). Of the approximately 27 actual examples included in the '397 patent, however, only two refer explicitly to the use of a heterogeneous mixture. In particular, the preparation of 4-(1-cyclohex-1-enyl) morpholine at column 11, line 62 uses a finely ground starting material in a solvent, and the preparation of phenyl vinyl ketone at column 12 line 16 describes a suspension of 5 grams of starting material in 400 milliliters of water. Other examples may create heterogeneous mixtures, but if so, Strauss does not appear to focus upon them.

Stated differently, the heterogeneous mixtures described by Strauss are in the neighborhood of about one percent by weight of the otherwise liquid volume being pumped. Furthermore, although Strauss refers to pressure control, it is in the nature of a continuous flow system and does not provide for extended residence times.

Katschnig U.S. Pat. No. 5,403,564 describes a microwave system for thermal decontamination of "pumpable or pourable" material, but essentially operates at between about one and two atmospheres.

Knapp U.S. Pat. No. 5,672,316 describes a flow-through system in which higher pressure is equilibrated by placing a flow path within a pressure-containing vessel while leaving one end of the flow path open to the interior of the vessel and a reservoir of liquid in the vessel to thereby cause the pressure on the inside and the outside of the flow path to be identical.

Haswell U.S. Pat. No. 5,215,715, which is commonly assigned with the present invention, describes a flow-through system in which samples to be digested are moved through a microwave cavity as discreet slugs at pressures of between about 30 and 120 pounds per square inch (PSI). The Haswell instrument is primarily for digestion rather than chemical synthesis as indicated by the nature of the flow-through system and the manner in which the slug and solvent are pumped through it.

Renoe U.S. Pat. No. 5,420,039, which is also commonly assigned with the present invention, describes a flow-through system in which water is pumped through at high pressure, but an ordinary sample is carried by the water rather than being pressurized. In particular, pressure is controlled in the 039 patent for the purpose of keeping gasses dissolved in a liquid sample so that the liquid sample can be consistently evaluated using a capacitance detection system.

Accordingly, in spite of the advantages and designs for microwave-assisted instruments, there remains a need for an instrument that can operate in automated, semi-continuous fashion, that can handle highly viscous liquids and heterogeneous mixtures, can do so at high pressure, and with microwave assistance.

SUMMARY

The invention is a controlled-flow microwave instrument for chemical synthesis that includes (or generates) heterogeneous or highly viscous materials, including starting materials. The instrument includes a microwave source for generating electromagnetic radiation in the microwave frequencies, a microwave cavity in wave communication with the source for exposing compositions placed in the cavity to microwave radiation, a microwave-transparent pressure resistant reaction vessel in the cavity, a source reservoir for starting materials and related compositions, a pump in communication with the source reservoir for pumping heterogeneous or highly viscous materials from the source to the reaction vessel, and a pressure-resistant valve between the pump and the reaction vessel for isolating the reaction vessel from the pump and the source during application of microwave energy to compositions in the vessel and from any resulting high pressures generated therein.

The foregoing and other objects and advantages of the invention and the manner in which the same are accomplished will become clearer based on the followed detailed description taken in conjunction with the accompanying drawings.

DETAILED DESCRIPTION

Figure 1:
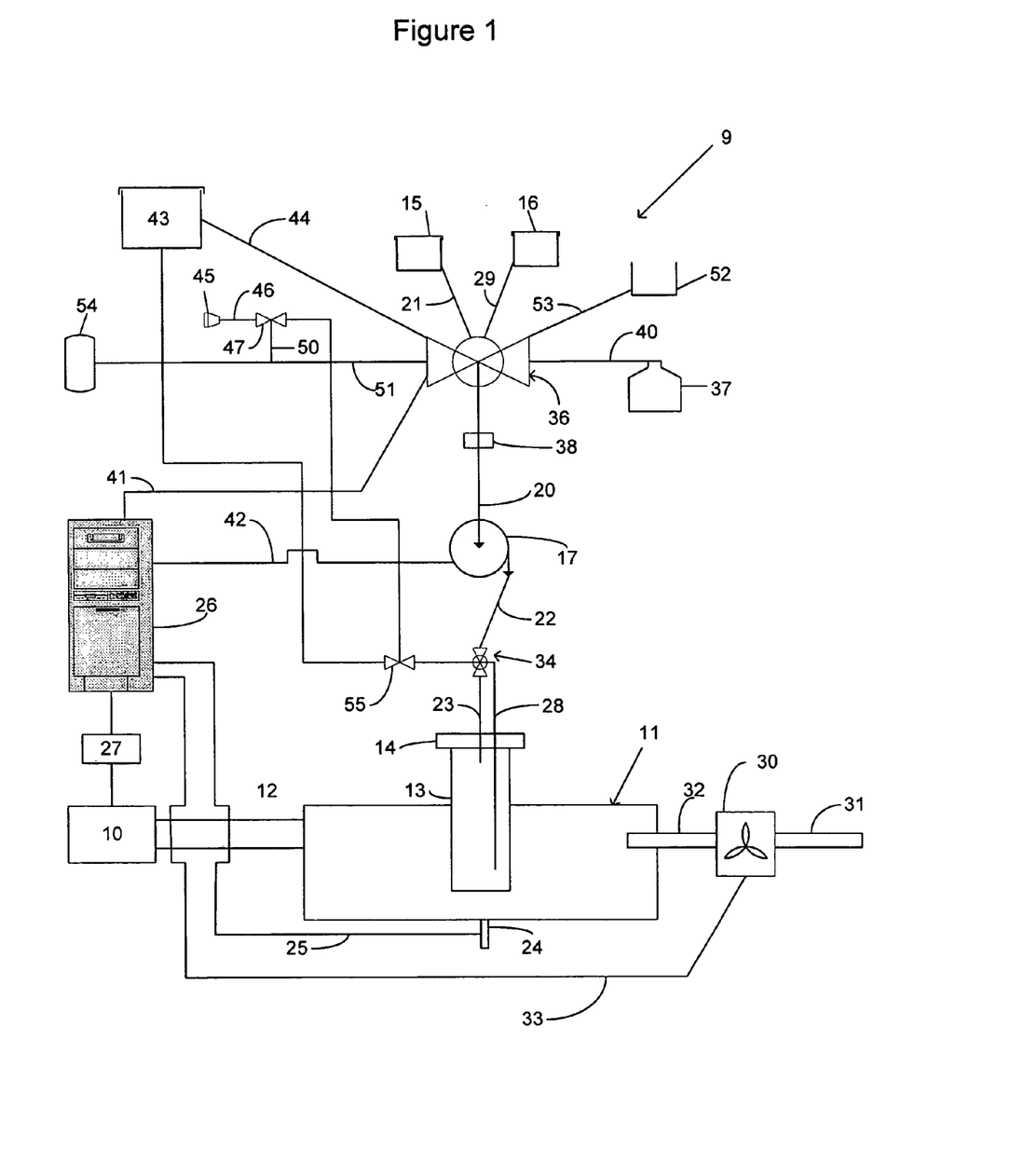
FIG. 1 is a schematic diagram of an instrument according to the claimed invention.

FIG. 1 is a schematic diagram of a controlled-flow microwave instrument for chemical synthesis using heterogeneous or highly viscous starting materials. The instrument comprises a microwave source designated at 10 for generating electromagnetic radiation in the microwave frequencies. A microwave cavity 11 is in wave communication with the source 10 for exposing compositions placed therein to microwave radiation. As illustrated in FIG. 1, the cavity 11 and the source 10 communicate through a waveguide 12. In preferred embodiments, the microwave cavity 10 is a single or dual mode cavity. Single and dual mode cavities are preferred because the value of the microwave field is predetermined at particular positions in the cavity on a consistent and reproducible basis.

A microwave transparent pressure resistant reaction vessel 13 is positioned (partially or entirely) within the cavity 11. Although it is sufficient for a portion of the vessel 13 to be transparent to microwave radiation, in preferred embodiments, the entire reaction vessel is transparent with the possible exception of an appropriate pressure fitting or cap illustrated at 14 in FIG. 1. The most preferred materials for the reaction vessel 13 are typically quartz, glass, or engineering plastics. In the preferred embodiments, the pressure resistant reaction vessel 13 has sufficient strength to maintain reactions therein at pressures of at least about 175 lbs. per square inch (psi). In the most preferred embodiments, the pressure-resistant reaction vessel 13 has strength sufficient to maintain pressures of at least about 250 lbs. per square inch, as well as all incremental pressures between 175 and 250 psi. There is, of course, no upper limit to the pressures that can be used in the vessel or the instrument other than the limits of the functional items such as the pressure vessel, the valves, and the pump. The indicated pressure range of 175–250 psi is, however, a range that is particularly useful for carrying out a wide variety of organic synthesis reactions, and thus is exemplary of the capabilities of the invention.

FIG. 1 illustrates two source reservoirs 15 and 16 for starting materials and related compositions such as catalysts, solvents and solid-supported reagents. For some starting materials and reactions, only one source reservoir is required, but more can be accommodated by including additional valves and piping as may be desired or necessary to carry out particular reactions or reaction schemes. The reservoirs 15 and 16 communicate with other portions of the instrument through the respective fluid lines 21 and 29. The term "reservoir" is used in a broad sense herein and does not necessarily refer to a particular type of container or vessel. Instead, the term can apply to any source of starting material, solvent, catalyst or any other composition that may be used in the reaction and pumped through the instrument in the manner described herein.

A pump 17, preferably a peristaltic pump, is in communication with the source reservoir 15 for pumping heterogeneous or highly viscous materials from the source 15 to the reaction vessel 13 through various fluid lines, two of which are designated at 22 and 28. Peristaltic pumps are generally well-understood in this (and other arts) and are commercially available from a wide variety of sources and will not be otherwise described in detail herein.

Although a peristaltic pump is preferred, other types of pumps can be used if desired or necessary with typical examples being diaphragm pumps or pneumatic pumps. These are likewise well understood in the art and will not be described in detail herein. Any pump is appropriate provided that it carries out its pumping function in accordance with the remainder of the operation of the instrument.

FIG. 1 also illustrates that the instrument comprises a temperature detector illustrated at 24 associated with the cavity 11 for measuring the temperature of the vessel 13 or its contents. In such embodiments, the instrument also comprises means for adjusting the microwave power applied from the source 10 to the cavity 11. In FIG. 1, the adjusting means is illustrated at 27 and can comprise (for example) a switching power supplying as set forth in commonly assigned U.S. Pat. No. 6,288,379, or an optical lens system as set forth in commonly assigned U.S. Pat. No. 5,796,080. The switching power supply moderates the applied microwaves by moderating the power supplied to the source 10. The lens system moderates the microwaves after they are generated and as they are propagated into the waveguide 12 and then into the cavity 11.

FIG. 1 illustrates that the instrument most preferably includes a processor illustrated at 26 in operative communication with the temperature detector 24 and the adjusting means 27 for adjusting the microwaves applied from the source 10 to the cavity 11 in response to the temperature measured by the detector 24. In preferred embodiments, the temperature detector 24 is an infrared optical detector which measures the wavelength of infrared radiation produced by the vessel 13 or its contents and converts this into an electrical signal which is carried by signal line 25 to the processor 26. In this manner, the temperature detector can be used to help moderate, control, or maintain a constant temperature within the cavity 11 or for the vessel 13 or its contents as may be desired or necessary for some or all portions of a chemical reaction scheme.

The instrument also preferably comprises means shown as the fan 30 for cooling the vessel (and thus its contents) in the cavity at any time, but particularly during the application of microwaves. As schematically illustrated in FIG. 1, the fan 30 includes an air intake 31 and an output 32 for directing a flow of cooling air into the cavity 11. Other cooling fluids can also be used, including an inert gas maintained at a desired low-temperature. The use of temperature control in organic synthesis reactions in connection with microwave assisted chemistry is set forth in commonly assigned U.S. Pat. No. 6,744,024, the contents of which are incorporated entirely herein by reference. As set forth therein, by controlling the temperature of a reaction while concurrently adding microwave radiation, the microwave radiation can drive or control the reaction in a desired manner, while keeping the vessel's contents below a temperature that would allow the reaction to proceed in an undesired manner or potentially decompose sensitive reactants or products.

In other circumstances, the reaction of interest may not need to be cooled during the application of microwaves, but the cooling function can be carried out after the reaction is complete for the purpose of cooling the vessel and its contents and reducing the internal pressure prior to opening the vessel in the manner described later herein. Stated differently, the instrument has the capability of cooling the cavity, the vessel and the vessel's contents at any time, but the ability to do so during the application of microwave radiation is particularly useful in carrying out certain reactions.

As illustrated in FIG. 1, the fan 30 is in operative communication through the signal line 33 with the processor 26 to thereby operate the fan 30 in response to the temperature measured by the temperature detector.

In preferred embodiments, the microwave source 10 is selected from the group consisting of magnetrons, klystrons, and solid-state devices. Magnatrons are often commercially preferred because of their well-understood operation, wide availability, moderate size, and appropriate cost. These tend to be commercial factors, however, and are not limiting of the scope of the invention.

As noted in the background, the characteristic problem with respect to microwave-assisted chemistry of heterogeneous mixtures is that such can typically be pumped at low pressures. Alternatively, heterogeneous reactions can be carried out at high pressures, but cannot be pumped at high pressures. Accordingly, in order to address these complimentary problems, the instrument includes a pressure resistant valve designated at 34 in FIG. 1. The pressure-resistant valve 34 is positioned between the peristaltic pump 17 and the reaction vessel 13 for isolating the reaction vessel 13 from the pump 17 and from the source 15 during application of microwave energy to compositions in the vessel 13 and for isolating the reaction vessel from the lower pressure portions of the instrument when high pressures are generated in the reaction vessel 13 as a result of the chemical reactions being carried out therein. In preferred embodiments, the pressure resistant valve comprises a ball valve that is pressure resistant to at least about 175 psi and preferably to at least about 250 psi, and to all pressure increments therebetween. In most circumstances, the pressure resistance of the valve 34 should at least match, and preferably exceed, that of the reaction vessel 13.

The valve 34 communicates with the vessel 13 through at least one fluid line illustrated at 28 in FIG. 1. As shown therein, the fluid line 28 preferably extends to a point near the bottom of the vessel 13 to thus permit materials to be delivered to, and more importantly pumped from, the bottom portions of the vessel 13. A gas line (23 in FIG. 1) is positioned in upper portions of the vessel 13 in order to best deliver an inert gas to the vessel to help push materials from the vessel after chemical reactions therein are completed.

The various fluid lines used in the instrument can be selected as may be desired or necessary for various purposes. Typically, the lines are formed of materials that are chemically inert to the materials being transferred therethrough and mechanically strong enough to withstand the desired or necessary pressures. Thus, glass, metal and polymers are all satisfactory candidate materials, with various fluorinated hydrocarbon polymers (e.g., polytetrafluoroethylene and related polymers) being particularly suitable. The lines 23, 28 between the ball valve 34 and the vessel 13 should, of course, be strong enough to withstand the expected high pressures generated by reactions in the vessel 13 and necessarily maintained between the vessel 13 and the ball valve 34.

In the more preferred embodiments, the peristaltic pump 17 is a two-way pump for adding materials to and pumping materials from the reaction vessel 13. In such embodiment, the instrument further comprises a multi-port valve broadly designated at 36 and positioned between the source reservoirs 15, 16 and the peristaltic pump 17 for controlling the flow of materials to and from the reaction vessel 13. Fluid line 20 connects the multi-port valve 36 to the pump 17. The multi-port (multi-function, multi-position) valve 36 is also in fluid communication with a product reservoir 37 through fluid line 40. In the most preferred embodiments, the multi-port valve 36 is also in communication with a processor (preferably the common processor 26), that is also in operative communication with the peristaltic pump 17 and the valve 36, for directing the flow of materials to and from the multi-port valve 36, the two-way pump 17, and the reaction cell 13. FIG. 1 illustrates that the valve 36 is in signal communication with the processor 26 through the signal line 41, and that the processor 26 is in communication with the peristaltic pump 17 through the signal line 42.

FIG. 1 also illustrates a plurality of fluid lines, some of which have already been designated with reference numerals, for providing the fluid communication described herein within the instrument. Thus, in conjunction with the fluid lines, the instrument further comprises a solvent supply 43 that connects to the valve 36 through the fluid line 44 for providing solvent to the reaction cell, or for rinsing and cleaning the various fluid lines, or both. A vent 45 is also in fluid communication with the multi-port valve 36 through fluid lines 46, gate (or equivalent) valve 47, and fluid lines 50 and 51. A waste reservoir 52 is also in fluid communication with the multi-port valve 36 through the fluid line 53 for receiving waste product, for example after rinsing ("backwashing").

In preferred embodiments, some of the fluid transfer, particularly for rinsing and backwashing, is carried out using an inert (i.e. chemically inert to the instruments and the reactions and the materials in the reactions) from a gas supply 54, which also communicates with the valve 36 through the fluid line 51. Depending upon the positions of the multi-port valve 36, the ball valve 34, the gate valve 47, a second gate valve 55, pressurized gas from the supply 54 can be used to push solvent through the respective lines in one or opposite directions as desired or necessary. Depending upon the orientation of the various valves, gas from the supply 54 can also be added to the vessel 13, either as a reactant or as an inert gas to help pump materials from the vessel 13.

The instrument also optionally includes a fluid level detector 38 that adds additional automated features to the instrument. In particular, one or two fluid level detectors 38 can be included, with only one illustrated in FIG. 1. When a single detector is used, it will detect the start ("head") of fluid flow from one of the reservoirs of 15, 16 toward the vessel 13. It can also detect the end of the flow (tail) and thus confirm that an appropriate amount of liquid has been added to the vessel. Because the processor 26 is programmed to know or select the amount of liquid being added to the vessel 13, the time period that extends between the head of the liquid flowing past the detector 38 and the tail of the liquid flowing past the detector 38 should correspond to the amount of liquid being sent to the vessel 13. If this differs from the amount calculated or desired by the processor, the instrument can be shut down until an operator can make the appropriate corrections or adjustments.

When two detectors are used, the detection of the head or tail of the fluid flow from one of the detectors to the next can also be used to calculate a flow rate which can be useful or necessary in a number of circumstances.

The lines and fixtures required to move solvent and gas in this manner are well understood in this art, and the flow paths indicated in FIG. 1 for this purpose are exemplary rather than limiting, and will not be described in further detail herein.

Figure 2:
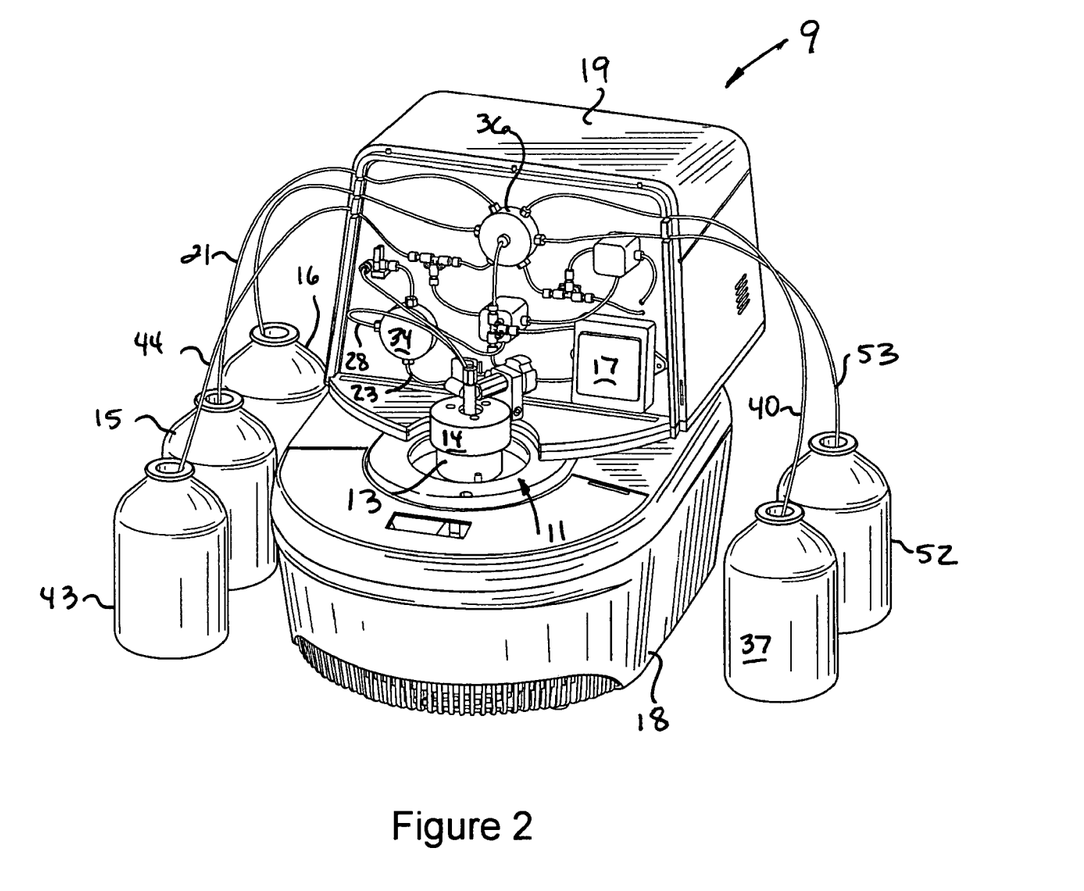
FIG. 2 is a perspective view of an instrument according to the claimed invention.

FIG. 2 is a perspective view of a commercial embodiment of the instrument shown schematically in FIG. 1. In FIG. 2 the instrument is broadly designated at 9, and includes a lower housing 18 and an upper housing 19. The cavity 11 is within the lower housing 18 and its location is broadly designated at 11. As described earlier, in preferred embodiments the portion of the instrument 9 that is included in the lower housing 18 is substantially identical to CEM's DISCOVER™ instrument which is described on CEM's web site (www.cem.com) and set forth in several of the previously-incorporated patents and applications.

Portions of the vessel 13 are positioned in the cavity 11 and the vessel 13 includes a pressure lid or cap 14 with various liquid and gas fittings attached to it, which for the sake of clarity are not separately numbered in FIG. 2.

FIG. 2 similarly illustrates a series of containers that correspond to those shown schematically in FIG. 1. These include the solvent reservoir supply 43, the starting material reservoirs 15 and 16, the product reservoir 37 and the waste reservoir 52. These all are respectively connected to the multi-port valve 36 using the various fluid lines as described in FIG. 1 and carrying the same reference numerals.

In FIG. 2 the peristaltic pump 17 is positioned within the upper housing 19. Similarly, the multi-port valve 36 and the ball valve 34 are illustrated in FIG. 2 and carry the same reference numerals as FIG. 1. In the illustrated embodiment, the upper housing 19 carries several various motors and (if necessary) associated gear or drive movements that drive the peristaltic pump 17, the ball valve and 34 and the multi-port valve 36.

Figure 3:
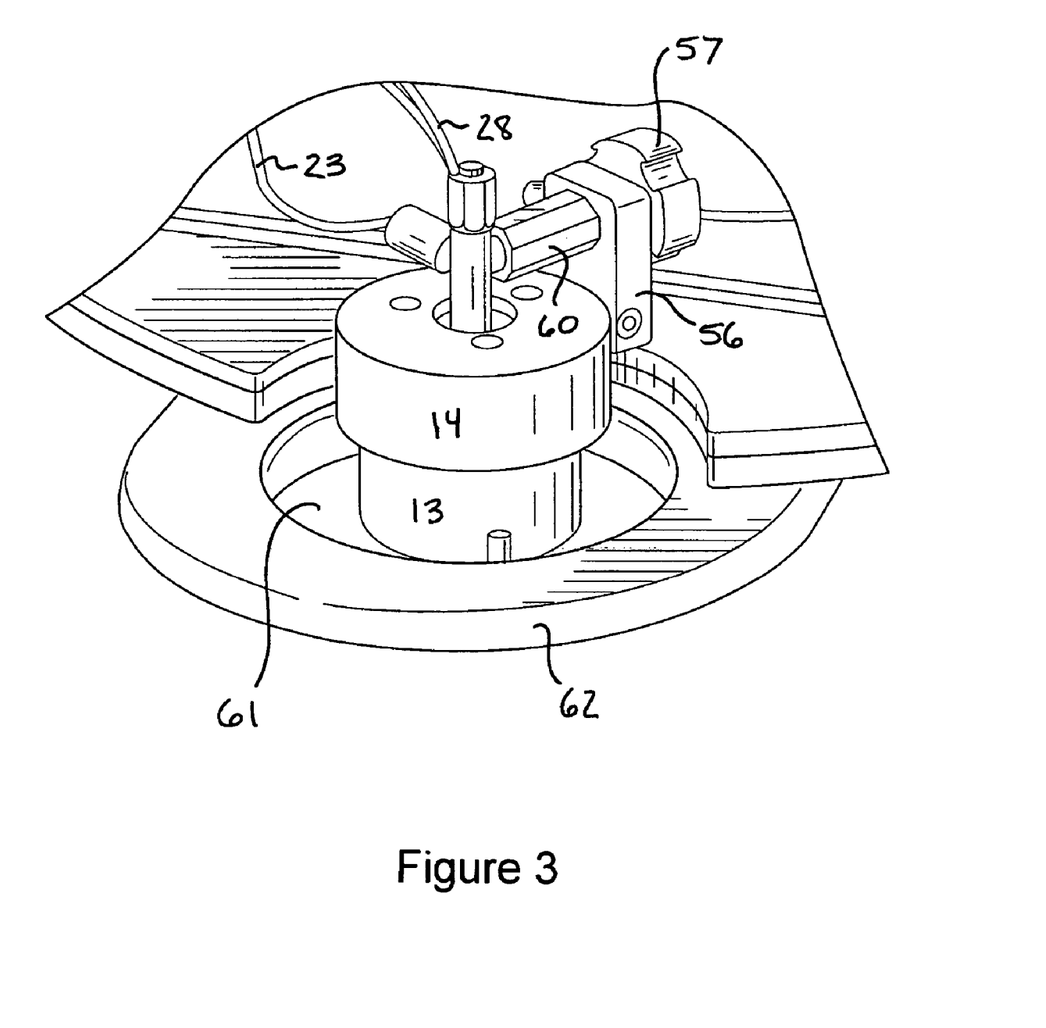
FIG. 3 is another perspective view of an enlarged portion of FIG. 2.

FIG. 3 is an enlarged view of a portion of FIG. 2 that shows the top of the vessel 13 in more detail. In addition to showing the vessel 13 and the pressure cap 14, FIG. 3 also illustrates a lock 56 and associated safety knob 57 that work in conjunction with a check valve 60 to prevent unintended release of high pressure gases from the vessel 13. In particular, the lock 56 prevents the cap 14 from being removed from the vessel 13 until the safety knob 57 has been opened to allow pressure to escape through the check valve 60. In this manner, the lock 56 and the knob 57 prevent the lid 14 from being removed from the vessel 13 when high pressures remain within the vessel 13.

FIG. 3 also shows the attenuator 61 on below the adapter plate 62. A number of the fluid and gas lines particularly 23 and 28 are also illustrated in the view of FIG. 3.

Although the operation of the instrument has been described in terms of the movement of individual samples, it will be understood that because the processor 26 is included and controls the valves, pump and related fluid flow, the instrument can be used in an automated fashion to carry out two or more identical or different reactions in sequence. The number of reactions that can be carried at in sequence is not limited by the processor or the vessel, but primarily by the number and type of reservoirs, fluid lines and valves that are included in any particular version of the device. Thus, it will be understood that the processor 26 can be programmed to carry out several reactions in sequence by selectively pumping specific starting materials from particular reservoirs at particular times to the reaction vessel and then exposing those materials to microwave radiation.

Following any one particular reaction, the vessel 13, the various fluid lines, and the valves 34 and 36 can be rinsed if necessary or desired with solvent from the solvent reservoir 43. Rinsing is optional, of course, and may not need to be carried out between all reactions, but the instrument provides the opportunity to carry out rinsing in manual or automated fashion as may be desired.

In another aspect, the invention is a method of conducting microwave assisted chemical reactions using high viscosity liquids or heterogeneous mixtures of liquids and solids. It will be understood that although the invention (as both instrument and method) is best described in terms of its capabilities of handling highly viscous liquids and heterogeneous mixtures, the invention is not limited to such materials, and homogeneous, free-flowing liquids (including compounds and solutions) can be used as well.

In this aspect, the method comprises pumping a discrete portion of a composition selected from the group consisting of high viscosity liquids and heterogeneous mixtures of liquids and solids to a microwave transparent pressure resistant reaction vessel at ambient pressures of between about atmospheric pressure and about 30 psi. The discrete portion is then isolated in the pressure resistant vessel, following which microwave radiation is applied to the isolated discrete portion in the reaction vessel to initiate and maintain a chemical reaction at a pressure of at least about 175 psi while preventing the vessel from releasing higher-pressure gases generated by a chemical reaction in the vessel. Pressure is next released from the vessel following desired completion of the chemical reaction and the reaction products of the discrete portion are pumped from the vessel at ambient pressures of between about atmospheric pressure and about 30 psi following the pressure release.

In preferred embodiments, and incorporating additional aspects of the processor 26 illustrated in FIG. 1, the method comprises pumping a second discrete portion after the first portion has been pumped out on the reaction vessel and thereafter carrying out the steps of isolating the second portion, applying microwave radiation to the second portion, releasing pressure from the vessel, and pumping reaction products from the vessel.

As a particular advantage over those continuous flow instruments that incorporate a length of tubing in the microwave field, the method can further comprise stirring the discrete portion in the reaction vessel during the step of applying microwave radiation. For the sake of clarity FIG. 1 does not illustrate such a stirrer, but it will be understood that a very typical and exemplary technique is to include a Teflon-coated magnetic stirrer bar in the vessel and to rotate it using an external magnet beneath or adjacent the vessel.

As noted previously, the step of applying microwave radiation preferably comprises applying single or dual modes rather than multiple modes in the cavity. Those familiar with microwave modes will recognize that the establishment of a specific single or duel mode in a particular cavity is a function of the wavelength (frequency) of the microwaves and the dimensions, potentially including the shape, of the cavity into which the microwaves are propagated. Differently shaped cavities can be incorporated with different wavelengths to produce a single or dual-mode of radiation. In the present invention, the single mode cavities that are described and set forth in the commonly assigned and previously-incorporated patents and applications are exemplary.

As set forth with respect to the structural aspects of the invention, the method can also comprise, and often typically comprises, maintaining their reaction vessel at a constant temperature for an extended portions of a chemical reaction, recognizing of course that the reaction will need to heat up to such temperature on as an initial part of the reaction scheme. The method also comprises measuring the temperature of the reaction vessel or of its contents, and then adjusting the application of microwave radiation in response to the measured temperature. The method also preferably comprises the step of measuring the temperature of the reaction vessel or its contents and cooling the reaction vessel in response to the measure temperature so that the combination of adjusting the applied or propagated microwave radiation and the application of cooling keeps the reaction subject to a desired amount of microwave radiation but at a desired fixed temperature.

In preferred embodiments, the method comprises maintaining the pressure in the reaction vessel at between about 175 and 250 psi as this range tends to be the temperature and pressure range at which a number of chemical reactions proceed most favorably.

As described with respect to the structural elements of the invention, the method can also comprise rinsing or back-washing the reaction vessel with a solvent between the steps of pumping the first reaction products and pumping the second discrete portion. In preferred embodiments, the method comprises driving the rinsing solvent with an inert gas. As used herein the term "inert" does not necessarily (although it can) refer to the noble gases, but includes any appropriate gas that does not disadvantageously react with the instrument, the reactants, or the products. In many (but not necessarily all) applications nitrogen is an appropriate inert gas for these purposes.

Because the number of components (reactants, products, catalysts, solid supports) is limited only by the selection valves and piping, the method preferably comprises mixing the composition to be pumped and exposed to microwaves from components selected from the group consisting of solids, liquids, solutions, solid phase catalysts and solid-supported reagents prior to the step of pumping the composition to the reaction vessel.

In the drawings and specification there has been set forth a preferred embodiment of the invention, and although specific terms have been employed, they are used in a generic and descriptive sense only and not for purposes of limitation, the scope of the invention being defined in the claims.

The invention claimed is:

1. A controlled-flow microwave instrument for chemical synthesis that includes heterogeneous or highly viscous materials, said instrument comprising
    a microwave source for generating electromagnetic radiation in the microwave frequencies;
    a microwave cavity in wave communication with said source for exposing compositions placed therein to microwave radiation;
    an infrared temperature detector associated with said cavity for measuring the temperature of items in said cavity;

means for adjusting microwave power applied from said source to said cavity;

a microwave-transparent pressure resistant reaction vessel in said cavity;

means for cooling said vessel in said cavity;

a source reservoir for starting materials and related compositions for the chemical synthesis reaction;

a two-way pump for adding materials to and pumping materials from said reaction vessel;

a multi-port valve between said source reservoir and said pump for controlling the flow of materials to and from said reaction vessel;

a second source reservoir for starting materials in fluid communication with said multi-port valve for providing said reaction vessel with a second set of staffing materials;

a product reservoir in fluid communication with said multi-port valve for collecting reaction products from said reaction vessel; and a processor in operative communication with said two-way pump and said multi-port valve for directing the flow of materials to and from said multi-port valve, said two way pump, and said reaction vessel.

2. An instrument according to claim 1 wherein said cavity is selected from the group consisting of single mode and dual mode cavities.

3. An instrument according to claim 1 comprising a processor in operative communication with said temperature detector and said adjusting means for adjusting the microwaves applied from the source to the cavity in response to the temperature measured by said temperature detector.

4. An instrument according to claim 3 comprising means for cooling said vessel in said cavity during the application of microwaves.

5. An instrument according to claim 4 wherein said cooling means is in operative communication with said processor for operating said cooling means in response to the temperature measured by said temperature detector.

6. An instrument according to claim 1 wherein said source is selected from the group consisting of magnetrons, klystrons and solid state devices.

7. An instrument according to claim 1 wherein said pressure-resistant multi-port valve comprises a ball valve.

8. An instrument according to claim 7 wherein said ball valve is pressure resistant to at least 175 psi.

9. An instrument according to claim 7 wherein said ball valve is pressure resistant to at least 250 psi.

10. An instrument according to claim 1 wherein said pressure-resistant reaction vessel has sufficient strength to maintain reactions therein at pressures of at least about 175 pounds per square inch.

11. An instrument according to claim 1 wherein said pressure-resistant reaction vessel has sufficient strength to maintain reactions therein at pressures of at least about 250 pounds per square inch.

12. An instrument according to claim 1 and further comprising:

a plurality of fluid lines for proving fluid communication within said instrument;

a solvent supply in fluid communication with said multi-port valve for providing solvent to said reaction cell and for rinsing and cleaning said fluid lines;

a vent in fluid communication with said multi-port valve for venting gases from said reaction vessel;

a waste reservoir in fluid communication with said multi-port valve for receiving waste product; and a gas supply in fluid communication with said multi-port valve and with said fluid lines for supplying gas pressure to urge materials through said fluid lines.

* * * * *

UNITED STATES PATENT AND TRADEMARK OFFICE
CERTIFICATE OF CORRECTION

PATENT NO. : 7,214,913 B2 Page 1 of 1
APPLICATION NO. : 11/151500
DATED : May 8, 2007
INVENTOR(S) : Michael John Collins, Jr. et al.

It is certified that error appears in the above-identified patent and that said Letters Patent is hereby corrected as shown below:

In claim 1, column 11, line 10, delete "a multi-port valve" and insert -- "a pressure-resistant multi-port valve" --

Signed and Sealed this

Nineteenth Day of June, 2007

JON W. DUDAS
*Director of the United States Patent and Trademark Office*